(12) United States Patent
Ohkubo (10) Patent No.: US 6,717,439 B2
(45) Date of Patent: Apr. 6, 2004

(54) DATA TRANSMITTING/RECEIVING BUFFER

(75) Inventor: Masahiko Ohkubo, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 10/269,857

(22) Filed: Oct. 15, 2002

(65) Prior Publication Data

US 2003/0141900 A1 Jul. 31, 2003

(30) Foreign Application Priority Data

Jan. 31, 2002 (JP) ........................................ 2002-024164

(51) Int. Cl.[7] .............................................. H03K 17/16
(52) U.S. Cl. .............................. 326/86; 326/90; 326/21
(58) Field of Search ........................ 326/86, 90, 56–58, 326/21; 710/100, 126

(56) References Cited

U.S. PATENT DOCUMENTS

| | | | | |
|---|---|---|---|---|
| 6,130,548 A | * | 10/2000 | Koifman | ...................... 326/21 |
| 6,167,001 A | * | 12/2000 | Wu | .............................. 368/113 |
| 6,618,686 B2 | * | 9/2003 | Allamsetty | .................. 702/120 |

FOREIGN PATENT DOCUMENTS

| | | |
|---|---|---|
| JP | 06-331658 | 12/1994 |
| JP | 07-159446 | 6/1995 |
| JP | 10-301899 | 11/1998 |

* cited by examiner

*Primary Examiner*—Vibol Tan
(74) *Attorney, Agent, or Firm*—Rabin & Berdo, P.C.

(57) ABSTRACT

According to the present invention, a data transmitting/receiving buffer provides an AND 5*a* for obtaining a logical product of an output enable signal/OE and receiving data RD, and outputting a receiving trigger signal RTG; inverter 6 for inverting the output enable signal/OE; and an AND 5*b* for obtaining a logical product of an output signal in the inverter 6 and transmitting data TD, and for outputting a receiving trigger signal RTG. It is possible to observe the only receiving signal by observing differential signals D+, D− at the cable side 30 by a receiving trigger signal RTG with an oscilloscope 40. Further, it is possible to observe the only transmitting signal by observing the differential signals D+, D− BY A TRANSMITTNG TRIGGER SIGNAL TTG. Thereby, a data transmitting/receiving buffer can select waveforms of a transmitting signal and a receiving signal to observe the selected waveform.

13 Claims, 5 Drawing Sheets

DATA TRANSMITTING/RECEIVING BUFFER

BACKGROUND OF THE INVENTION

1. Field of the Invention

The present invention relates to a data transmitting/receiving buffer such as a USB (Universal Serial Bus). More particularly, the present invention relates to a test circuit thereof. This application is counterpart of Japanese patent applications, Serial Number 24164/2002, filed Jan. 31, 2002, the subject matter of which is incorporated herein by reference.

2. Description of the Related Art

A USB is an interface to connect peripheral devices such as a keyboard, a mouse, a modem and a printer to a personal computer (hereinafter, referred to as PC) using the same connectors and the same cables. As a result of strategy by each company of COMPAC, INTEL, MICROSOFT and NATIONAL SEMICONDUCTOR, a formal specification is disclosed as USB 1.0 in February, 1996.

According to the USB, 127 functions (peripheral devices) can be connected to one host (one personal computer) at the maximum. In adjustment for a bus, the host manages the adjustment and the only function to which a token is issued from the host can access to this host. The host is connected to the function by means of a half-double connection. A high speed mode, which is 12 Mbps at the maximum and a low speed, which is 1.5 Mbps are mixed in a data transfer speed.

Figure 2:
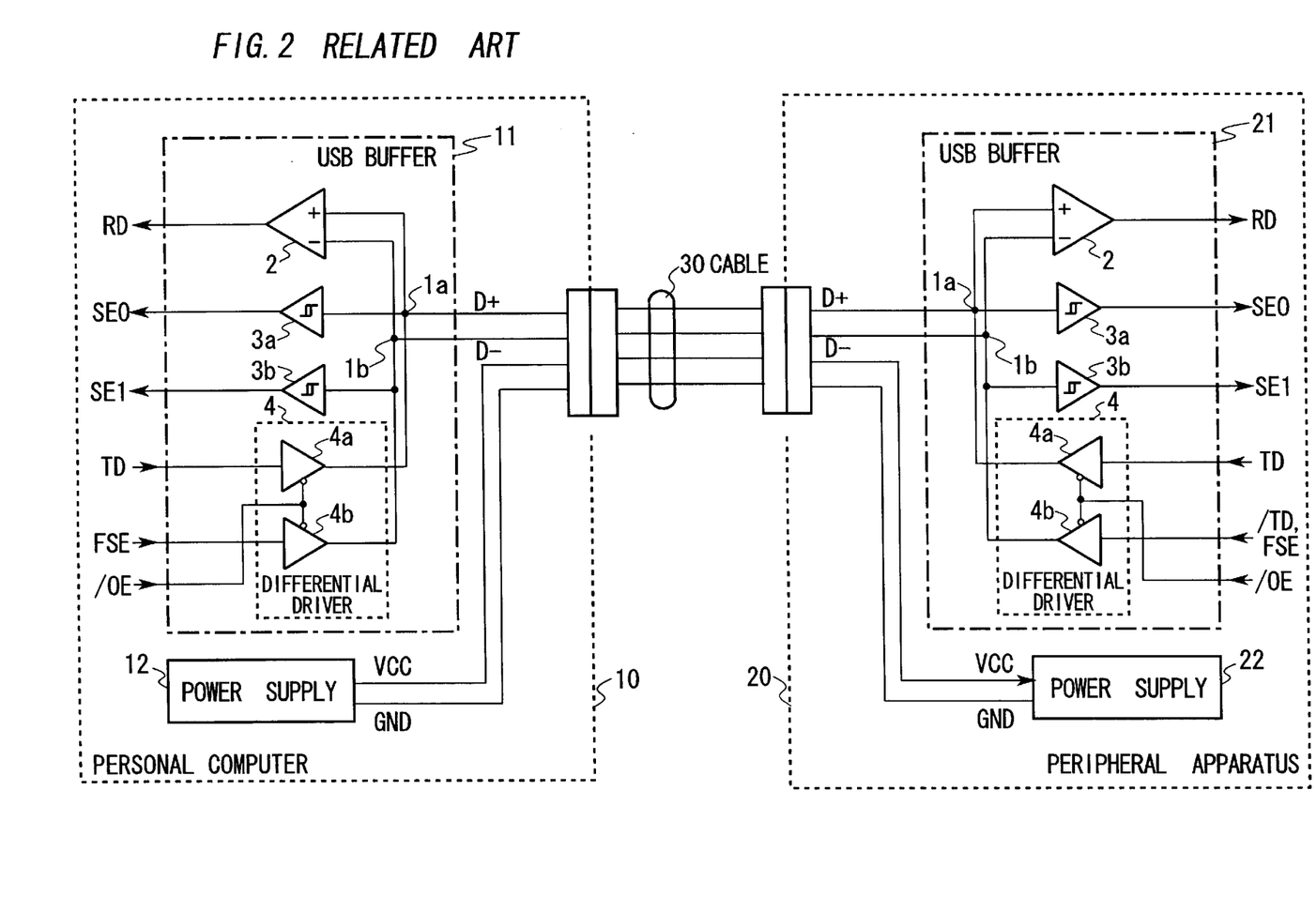
FIG. 2 is a diagram of a configuration showing connection of a PC to a peripheral apparatus by a conventional USB.

FIG. 2 is a diagram of configuration showing connection of a PC to a peripheral apparatus by a conventional USB.

A personal computer 10 and a peripheral apparatus 20 are connected to each other by a dedicated cable 30 whose both ends are connected to connectors. In the PC 10 is provided with a USB buffer 11 to transmit/receive data to/from the peripheral apparatus 20 and a power supply 12 to supply an electric power to the peripheral apparatus side. In a peripheral apparatus 20 there is provided a USB buffer 21 to transmit/receive data to/from the personal computer 10 via the cable 30 and a power supply 22 to supply the electric power supplied from the personal computer side to the inside the peripheral apparatus.

A configuration of USB buffer 11 of the PC 10 is similar to the USB buffer 21 of the peripheral apparatus 20. Each of the USB buffer 11 and the USB buffer 21 have nodes 1a, 1b, a differential receiver 2, single end receivers 3a, 3b and a differential driver 4.

Nodes 1a, 1b are terminals to be connected to differential signals D+, D− on the cable 30. The differential receiver 2 is connected to the nodes 1a, 1b and outputs receiving data RD based on potentials of the differential signals D+, D−. When the signal D+ is a "H" level (4V) and the signal D− is an "L" level (0V), the receiving data RD output from the differential receiver 2 becomes "H". When the signal D+ is "L" and the signal D− is "H" or "L", the receiving data RD becomes "L".

The single end receivers 3a, 3b are buffer amplifiers having configurations, which are Schmitt trigger circuits. The single end receivers 3a, 3b have a hysteresis characteristic that an output signal becomes "H" when an input signal exceeds a threshold value of the top side (2V), and the output signal becomes "L" when the input signal lowers to less than a threshold value of the bottom side (0.8V). Input parts of the single end receivers 3a, 3b are respectively connected to the nodes 1a, 1b, and signals SE0, SE1 are output from the single end receivers 3a, 3b.

The differential driver 4 consists of 3-state-type buffer amplifiers 4a, 4b, the differential driver 4 outputs data when an output enable signal/OE is "L", and an output part becomes a high impedance when an output enable signal/OE is "H". Transmitting data TD are supplied to an input part of the buffer amplifier 4a and the output part of the buffer amplifier 4a is connected to the node 1a. The transmitting data/TD where the transmitting data TD is inverted are supplied to the input part of the buffer at a time of transmitting data, and a signal FSC of "L" is supplied at a time where transmission is finished. The output part of the buffer amplifier is connected to the node 1b.

The nodes 1a, 1b in the USB buffer 11 at the PC 10 side respectively are pulled down with a resistance of 1.5Ω. At the peripheral apparatus 20 side, the node 1a is pulled up with the resistance of 1.5Ω in a high speed mode, and the node 1b is pulled up with the resistance of 1.5Ω in a low speed mode (not shown in FIG. 2).

To transfer data with less error at a high speed using such a USB, waveforms of the differential signals D+, D− transmitted on the cable 30 are accurately defined.

Figure 3:
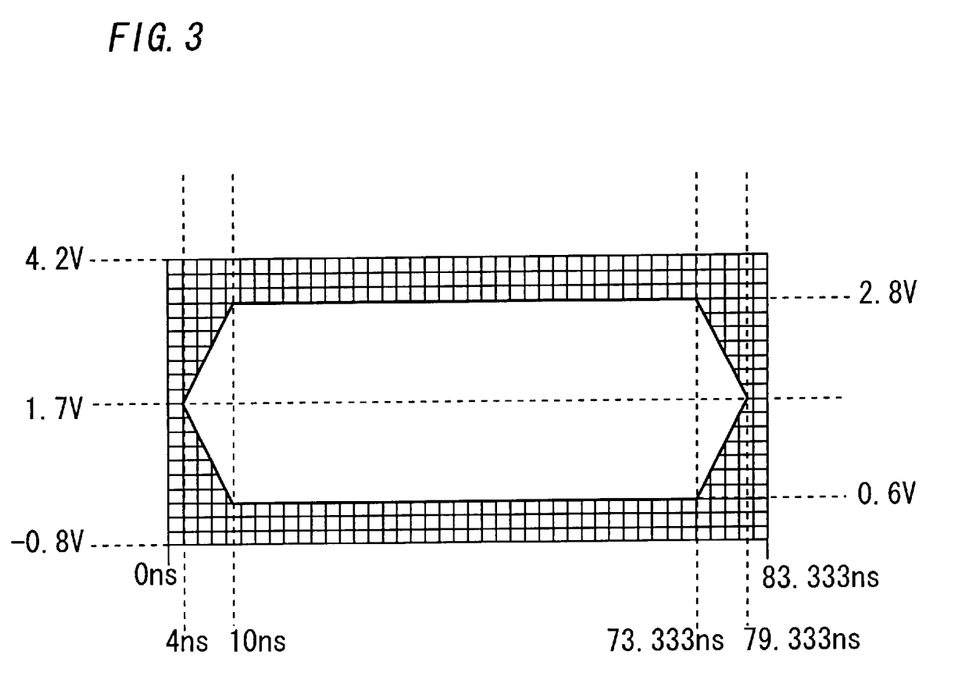
FIG. 3 is a view showing standard of USB signal waveform in a high speed mode.
Figures 4A, 4B, 4C:
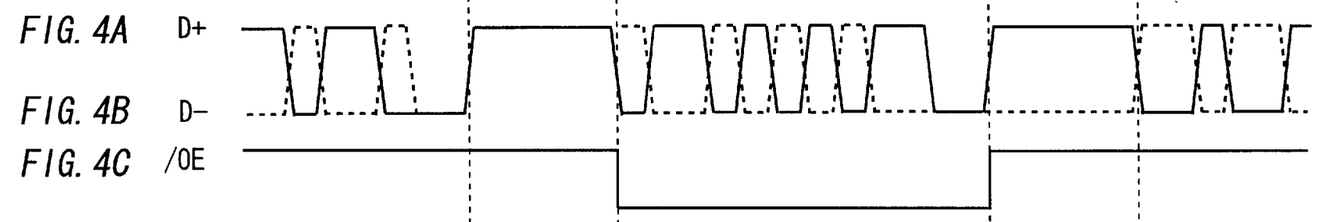
FIGS. 4A to 4G show signal waveform of a USB buffer 21A in FIG. 1.
Figure 4D:
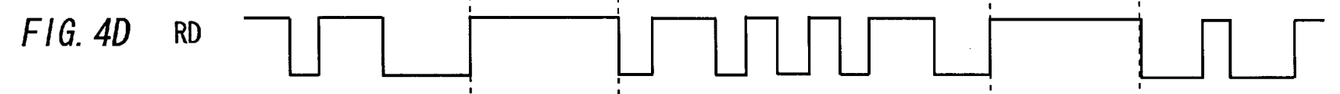
Figure 4E:
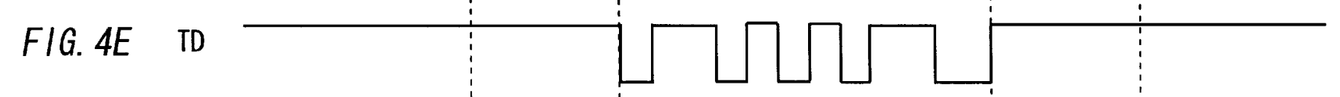
Figure 4F:
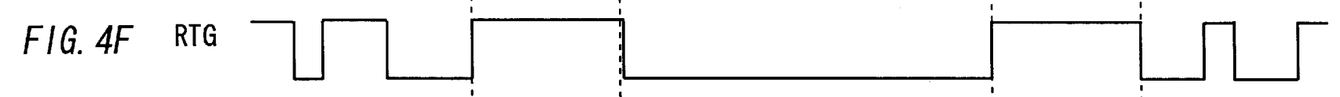
Figure 4G:
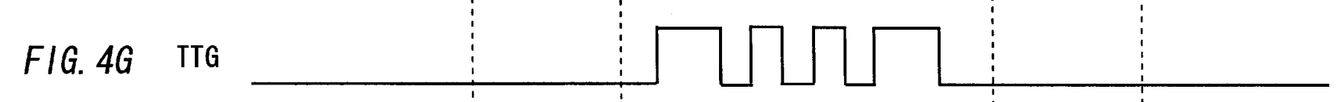

FIG. 3 is a view showing standard of USB signal waveform in the high speed mode. In FIG. 3, an x-axis and a y-axis respectively show a time and a voltage, and FIG. 3 defines speeds to rise and fall the differential signals D+, D− and standardization of levels of "H", "L". It is necessary not to enter waveforms of the differential signals D+, D− corresponding to one element into a reversed portion (eye in a hexagon shape, i.e., eye pattern) in FIG. 3.

When characteristics of the USB buffers 11, 21 are tested, for example, the eye pattern of the differential signals D+, D− is observed in a state where the PC 10 is connected to the peripheral apparatus 20 by the cable 30, and an oscilloscope is connected to the nodes 1a, 1b of the USB buffer 21.

However, in the conventional USB buffers 11, 21 there is a problem in that there is no signal except for the differential signals D+, D− as a signal, which is trigger when the differential signals D+, D− of the nodes 1a, 1b are observed by the oscilloscope. Therefore, for example, the oscilloscope displays the eye pattern as trigger, which is timing of rise of the signal D+. However, since two-ways communication of half-double is performed in the USB, it is not possible to identify whether an observed waveform is a receiving signal or a transmitting signal. Therefore, there is a problem that in a case where a signal waveform does not meet standardization, it is not possible to specify that either a transmitting operation or a receiving operation has default.

SUMMARY OF THE INVENTION

Therefore, it is an object to provide a data transmitting/receiving buffer such as a USB capable of selecting waveforms of a transmitting signal and a receiving signal to observe the selected waveform, which are capable of overcoming the above drawbacks accompanying the conventional art. The above and other objects can be achieved by combinations described in the independent claims. The dependent claims define further advantageous and exemplary combinations of the present invention.

According to a first aspect of the present invention, a data transmitting/receiving buffer for transmitting/receiving data via a data line provided between a first apparatus and a second apparatus, includes: a receiver which receives a signal on the data line and which outputs the receiving data; a driver which outputs transmitting data to the data line when a transmitting enable signal is supplied; and a transmitting signal trigger output circuit which outputs a transmitting trigger signal based on the transmitting enable signal and the transmitting data.

According to the first aspect, since the data transmitting/receiving buffer is configured as described above, the data transmitting/receiving buffer has the following function.

When the transmitting enable signal and the transmitting data are supplied at a time of output, the signal is transmitted from the driver to the data line, and the transmitting trigger signal is output from the transmitting trigger output circuit based on this output. Therefore, by observing the signal on the data line as trigger, which is the transmitting trigger signal with the oscilloscope, it is possible to select the only transmitting signal to observe the selected signal.

According to a second aspect, a data transmitting/receiving buffer for transmitting/receiving data via a data line provided between a first apparatus and a second apparatus, includes: a receiver which receives a signal on the data line and which outputs the receiving data; a driver which outputs transmitting data to the data line when a transmitting enable signal is supplied; and a receiving signal trigger output circuit which outputs a receiving trigger signal based on the transmitting enable signal and the receiving data.

According to the second aspect of the present invention has the following function.

When the signal on the data line is received by the receiver and the receiving data are output at a time of input, the receiving trigger signal is output from the receiving trigger output circuit on this input. Therefore, by observing the signal on the data line as trigger, which is the receiving trigger signal with the oscilloscope, it is possible to select the only receiving signal to observe the selected signal.

According to a third aspect, the data line is a universal serial bus.

According to a fourth aspect, the data line is a universal serial bus.

According to a fifth aspect, the receiver is a differential-type receiver which receives a differential signal on the universal serial bus.

According to a sixth aspect, the data transmitting/receiving buffer provides a receiver, a driver and a transmitting trigger output circuit similar to the first aspect; and a receiving trigger output circuit similar to the second aspect.

According to the sixth aspect, the transmitting trigger signal is output from the transmitting trigger output circuit at the time of output and the receiving trigger signal is output from the receiving trigger output circuit at the time of input. Therefore, by observing the signal on the data line with the oscilloscope as trigger, which is the transmitting trigger signal or the receiving trigger signal, it is possible to select one of the transmitting signal or the receiving signal to observe the selected signal.

According to a seventh aspect, the driver is a differential-type driver which converts the transmitting data into the differential signal and which outputs the converted differential signal on the data line.

According to an eighth aspect, the driver is a differential-type driver which converts the transmitting data into the differential signal and which outputs the converted differential signal on the data line.

According to a ninth aspect, a data transmitting/receiving buffer for transmitting/receiving data via a data line provided between a first apparatus and a second apparatus, includes: a receiver which receives a signal on the data line and which outputs the receiving data; a driver which outputs transmitting data to the data line when a transmitting enable signal is supplied; and a transmitting signal trigger output circuit which outputs a transmitting trigger signal based on the transmitting enable signal and the transmitting data; and a receiving signal trigger output circuit which outputs a receiving trigger signal based on the transmitting enable signal and the receiving data.

According to a tenth aspect, the data line is a universal serial bus.

According to ninth and tenth aspects have the following functions.

When the transmitting data is transmitted to the data line by the driver at the time of output, the transmitting signal is received by the receiver and the receiving data are output. The transmitting enable signal is held at timing where the receiving data is changed and the held transmitting enable signal is output from the trigger output circuit as the trigger signal.

At the time of input, the signal on the data line is received by the receiver and the receiving data are output. The transmitting enable signal is held at timing where the receiving data is changed and the held transmitting enable signal is output from the trigger output circuit as the trigger signal.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE PREFERRED EMBODIMENTS

The invention will now be described based on preferred embodiments, which do not intend to limit the scope of the present invention, but rather to exemplify the invention. All of the features and the combinations thereof described in the embodiments are not necessarily essential to the invention.
(First Embodiment)

Figure 1:
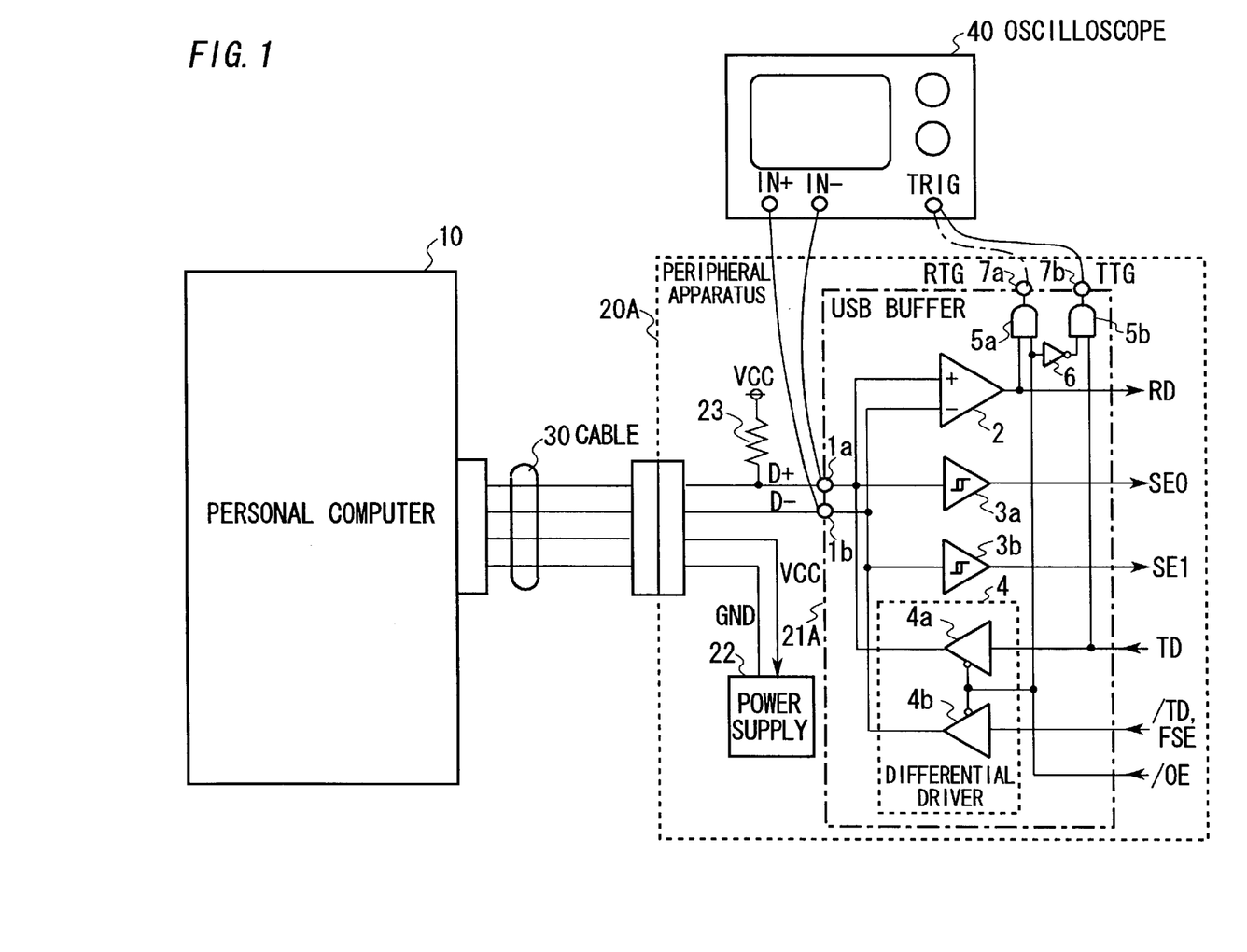
FIG. 1 is a diagram of configuration to connect a PC and a peripheral apparatus by a USB showing a first embodiment in the present embodiment.

FIG. 1 is a diagram of configuration to connect a PC (upper apparatus) and a peripheral apparatus (lower apparatus) by a USB according to a first embodiment of the present embodiment. The same reference numerals for components in FIG. 1, which is the same as ones in FIG. 2 are applied.

A PC 10 and a peripheral apparatus 20A in a high speed mode are connected by a dedicated cable 30 whose both ends are connected to connectors. In the PC 10 is provided a not shown USB buffer and a power supply to supply an electric power to the peripheral apparatus side.

In a peripheral apparatus 20A there is provided a USB buffer 21A to transmit/receive data to/from the PC 10 via the cable and a power supply 22 to supply the electric power supplied from the PC side to the inside the peripheral apparatus.

USB buffer 21A has nodes 1a, 1b, a differential receiver 2, single end receivers 3a, 3b, a differential driver 4, logical product gates (hereinafter, referred to as AND) 5a, 5b, inverter 6 and observation nodes 7a, 7b.

Nodes 1a, 1b are terminals to be connected to differential signals D+, D− on the cable 30. Since the peripheral apparatus 20A is set so as to be operated in the high speed mode, the node 1a is pulled up to a potential VCC (4V) via a resistance 23 of 1.5Ω.

The differential receiver 2 is connected to the nodes 1a, 1b and outputs receiving data RD based on potentials of differential signals D+, D−. When the signal D+ is "H" (4V) and the signal D− is "L" (0V), the receiving data RD output from the differential receiver 2 become "H". When the signal D+ is "L" and the signal D− is "H" or "L", the receiving data RD becomes "L".

The single end receivers 3a, 3b are buffer amplifiers having configurations, which are constituted by the Schmitt trigger circuits. The single end receivers 3a, 3b have a hysteresis characteristic that an output signal becomes "H" when an input signal exceeds a threshold value of the top side (2V), and the output signal becomes "L" when the input signal turns to be lower than a threshold value of the bottom side (0.8V). Input parts of the single end receivers 3a, 3b are respectively connected to the nodes 1a, 1b, and signals SE0, SE1 are output from the single end receivers 3a, 3b.

The differential driver 4 consists of 3-state-type buffer amplifiers 4a, 4b, the differential driver 4 outputs data when an output enable signal/OE is "L", and an output part becomes a high impedance when an output enable signal/OE is "H". Transmitting data TD are supplied to an input part of the buffer amplifier 4a, transmitting data/TD where the transmitting data TD is inverted are supplied to the input part of the buffer at a time of transmitting data, and a signal FSC of "L" is supplied at a time where transmission is finished. The output part of the buffer amplifier 4b is connected to the node 1b.

The receiving data RD output from the differential receiver 2 are supplied to a first input part of the AND 5a and the output enable signal/OE is supplied to a second input part. The output part of the AND 5a is connected to an observation node 7a and a receiving trigger signal RTG is output from the observation node 7a. The transmitting data TD are supplied to the first input part of the AND 5b and the output enable signal/OE is inverted at an inverter 6 to be supplied to the second input part. The output part of the AND 5b is connected to the observation node 7b and a transmitting trigger TTG is output from the observation trigger 7b.

FIGS. 4A to 4G show signal waveform of the USB buffer 21A in FIG. 1. Below, operations at a time of observing the differential signals D+, D− in FIG. 1 will be described, below referring to FIGS. 4A to 4G.

As shown in FIG. 1, input terminals IN+, IN− of the oscilloscope 40 for observing waveform respectively are connected to the nodes 1a, 1b of the USB buffer 21A. A trigger terminal TRIG of the oscilloscope 40 is connected to the observation node 7a of the USB buffer 21A to observe a receive signal. When the transmit signal is observed, the trigger terminal TRIG of the oscilloscope is connected to the observation node 7b of the USB buffer 21A.

As shown in FIGS. 4A to 4G, the differential signals D+, D− transmitted from the PC 10 are applied to the nodes 1a, 1b, and the receiving data RD are output from the differential receiver 2. Since the output enable signal/OE is set to "H" at this time, a signal with the same waveform as one of the receiving data RD is output from the output part of the AND 5a as the receiving trigger signal RTD. The receiving trigger signal RTG is supplied to the trigger terminal TRIG of the oscilloscope 40 via the observation node 7a. In the oscilloscope 40, an eye pattern of the receiving signal can be obtained by superimposing the differential signals D+, D− at timing of rise of the receiving trigger signal RTG to observe the superimposed differential signals.

The differential signals D+, D− are respectively fixed to "H", "L" during an idle cycle, and the output enable signal/OE is "H". Therefore, the receiving data RD and the receiving trigger signal RTG become "H".

The output enable signal/OE is set to "L" during a transmitting cycle, and transmitting data TD,/TD are supplied to the differential driver 4. Thereby, the differential signals D+, D− corresponding to the transmitting data TD,/TD are output to the nodes 1a, 1b. The differential signals D+, D− of the nodes 1a, 1b are transmitted to the PC 10 via the cable 30, and received by the differential receiver 2. The receiving data ED are output from the differential receiver 2. However, since the output enable signal/OE is set to "L" at this time, the receiving trigger signal RTG output from the AND 5a is fixed to "L". The waveform of the transmitting signal is not observed in the oscilloscope 40 regardless of the trigger.

The output enable signal/OE is inverted at the inverter 6 to be supplied to the second part of the AND 5b. Therefore, the transmitting trigger signal TTG output from the AND 5b is fixed to "L" during the receiving cycle and the idle cycle. In contrast, a signal with the same waveform as one of the transmitting data TD is output as the transmitting trigger signal TTG during the transmitting cycle. Since the transmitting trigger signal TTG is output from the observation node 7b, the eye pattern of the transmitting signal can be obtained by connecting the trigger terminal TRIG in the oscilloscope 40 to the observation node 7b.

As described above, the USB buffer 21A in the first embodiment includes the AND 5a to output the receiving trigger signal RTG based on the receiving data RD and the output enable signal/OE, and the AND 5b to output the transmitting trigger signal TTG based on the transmitting data TD and the output enable signal/OE. Thereby, there is an advantageous that waveforms of the transmitting signal and the receiving signal are selected to be observed. Since a waveform of the transmitting trigger signal TTG is the same as one of the transmitting data TD, the waveform of the transmitting signal can be observed in an accurate timing without influence of degradation of the waveform in the receiving signal.

(Second Embodiment)

Figure 5:
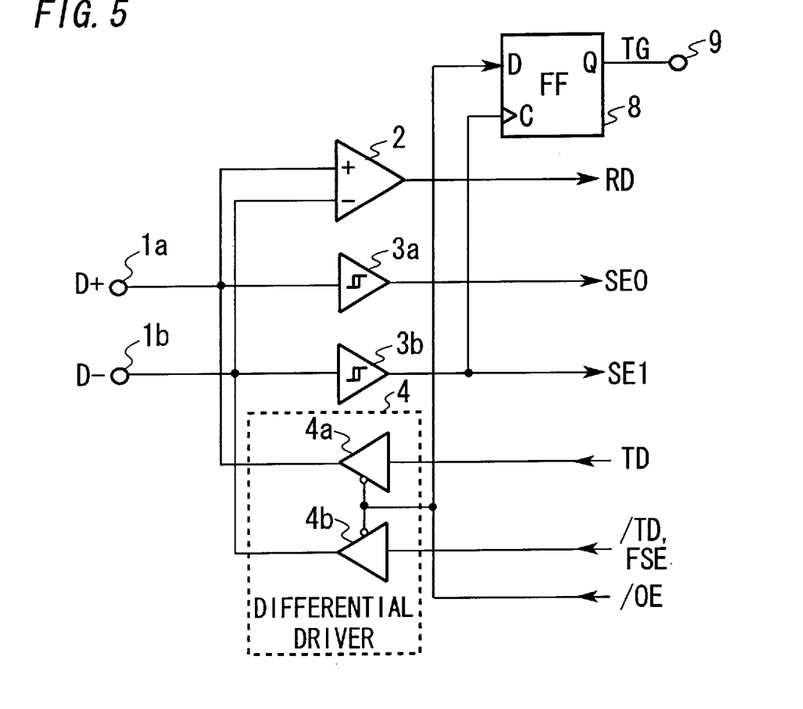
FIG. 5 is a diagram of a configuration of a USB buffer showing a second embodiment in the present invention.

FIG. 5 is a diagram showing a configuration of a USB buffer according to a second embodiment of the present invention, and the same reference numerals for the same elements as ones in FIG. 1 are applied.

The USB buffer has a flip flop 8 (FF) and an observation node 9 in addition to the nodes 1a, 1b, the differential receiver 2, the single end receivers 3a, 3b and the differential driver 4.

The output enable signal/OE is supplied to a data input terminal of the FF8 and a signal SE1 output from the single end receiver 3b is supplied to a clock terminal C. An output terminal of the FF8 is connected to the observation node 9, and the trigger signal TG is output from the observation node 9. The other configurations are the same as ones of FIG. 1.

Figure 6:
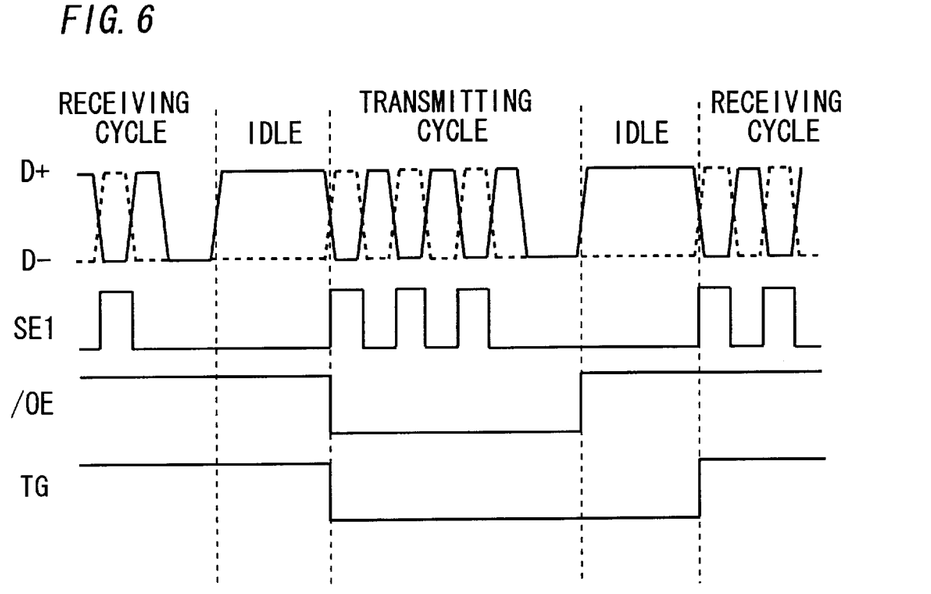
FIG. 6 shows signal waveform of the USB buffer in FIG. 5.

FIG. 6 shows signal waveform of the USB buffer in FIG. 5.

As shown in FIG. 6, the output enable signal/OE is changed from "H" to "L" when the receiving cycle and the idle cycle are ended. During the transmitting cycle, "L" is kept in the FF8 when the signal SE1 output from the single end receiver 3b is risen, and the trigger signal TG output from the FF8 is changed from "H" to "L".

Since the output enable signal/OE is "L" during the transmitting cycle, the trigger signal TG is not changed. Although the output enable signal/OE is changed from "L" to "H" during the idle cycle after the transmitting cycle is ended, the signal SE1 keeps "L". Thereby, the trigger signal TG is not changed.

When the signal SE1 rises during the receiving cycle after the idle cycle, "H" is kept in the FF8 and the trigger signal TG is changed from "L" to "H". Since the output enable signal/OE is "H" during the receiving cycle, the trigger signal TG is not changed.

The trigger signal TG is changed from "H" to "L" at the beginning of transmitting cycle and changed from "L" to "H" at the beginning of the receiving cycle. Therefore, it is possible to select the waveforms of the transmitting signal and the receiving signal for observing the waveforms by supplying the trigger signal TG to the trigger terminal of the oscilloscope.

As described above, the USB buffer in the second embodiment provides the FF8 to hold the output enable signal/OE based on rise of the signal SE1 after the idle cycle is ended and to output that signal as the trigger signal TG. Thereby, there is an advantageous that it is possible to the waveforms of the transmitting signal and the receiving signal for observing the waveforms. Further, there is another advantageous that since the transmitting and receiving trigger signals are output from one observation node 9, one terminal is sufficient.

The present invention is not limited to the above embodiments and various modifications are available. As examples of the modifications are as follows:

(a) A generation circuit of a transmitting trigger signal TTG and a receiving trigger signal RTG is not limited to a circuit constituted by the AND 5a, AND 5b and the inverter 6.

(b) A configuration of a transmitting/receiving circuit in a USB buffer is not limited to a configuration to combine the differential receiver 2, the single end receivers 3a, 3b and the differential driver 4. The configuration of the transmitting/receiving circuit is similarly applicable to any of configurations of the transmitting/receiving circuit.

(c) Although the USB buffer at the peripheral apparatus side is described, the configuration of a transmitting/receiving circuit is similarly applicable to the USB buffer at the PC side.

(d) Although the USB buffer 21A in FIG. 1 provides the AND 5a to output the receiving trigger signal RTG and the AND 5b to output the transmitting trigger signal TTG, the USB buffer 21A may provide the only one of the AND 5a and the AND 5b.

(e) The buffer is similarly applicable for data transmitting/receiving buffers except for the USB buffer.

As described above in detail, the first, third, fourth and fifth inventions have a transmitting trigger output circuit to output a transmitting trigger signal based on a transmitting enable signal and transmitting data. Thereby, it is possible to select the only transmitting signal on a data line for observing the transmitting signal.

The second, third, fourth and fifth inventions have a receiving trigger output circuit to output a receiving trigger signal based on the transmitting enable signal and receiving data. Thereby, it is possible to select the only receiving signal on the data line for observing the receiving signal.

The sixth, seventh and eighth inventions have a transmitting trigger output circuit to output the transmitting trigger signal based on the transmitting enable signal and transmitting data. Also, the sixth, seventh and eighth inventions have a receiving trigger output circuit to output the receiving trigger signal based on the transmitting enable signal and receiving data. Thereby, it is possible to select the transmitting/receiving signal on the data line for observing the transmitting/receiving signal.

The ninth and tenth inventions have a trigger output circuit to hold the transmitting enable signal at timing receiving data are changed and to output that signal as the trigger signal. Thereby, timing at the beginning of receiving cycle is shown in rising the trigger signal and timing at the beginning of transmitting cycle is shown in falling this trigger signal. Therefore, it is possible to output transmitting timing and receiving timing in one signal.

Although the present invention has been described by way of exemplary embodiments, it should be understood that those skilled in the art might make many changes and substitutions without departing from the spirit and the scope of the present invention which is defined only by the appended claims.

What is claimed is:

1. A data transmitting/receiving buffer for transmitting/receiving data via a data line provided between a first apparatus and a second apparatus, comprising:
   a receiver which receives a signal on said data line and which outputs the receiving data;
   a driver which outputs a transmitting data to said data line when a transmitting enable signal is supplied; and
   a transmitting signal trigger output circuit which outputs a transmitting trigger signal based on said transmitting enable signal and said transmitting data.

2. A data transmitting/receiving buffer for transmitting/receiving data via a data line provided between a first apparatus and a second apparatus, comprising:
   a receiver which receives a signal on said data line and which outputs the receiving data;
   a driver which outputs transmitting data to said data line when a transmitting enable signal is supplied; and
   a receiving signal trigger output circuit which outputs a receiving trigger signal based on said transmitting enable signal and said receiving data.

3. A data transmitting/receiving buffer according to claim 1, wherein said data line is a universal serial bus.

4. A data transmitting/receiving buffer according to claim 2, wherein said data line is a universal serial bus.

5. A data transmitting/receiving buffer according to claim 3, wherein said receiver is a differential-type receiver which receives a differential signal on said universal serial bus.

6. A data transmitting/receiving buffer according to claim 4, wherein said receiver is a differential-type receiver which receives a differential signal on said universal serial bus.

7. A data transmitting/receiving buffer according to claim 3, wherein said driver is a differential-type driver which converts said transmitting data into said differential signal and which outputs said converted differential signal to said data line.

8. A data transmitting/receiving buffer according to claim 4, wherein said driver is a differential-type driver which converts said transmitting data into said differential signal and which outputs said converted differential signal to said data line.

9. A data transmitting/receiving buffer for transmitting/receiving data via a data line provided between a first apparatus and a second apparatus, comprising:

a receiver which receives a signal on said data line and which outputs the receiving data;

a driver which outputs transmitting data to said data line when a transmitting enable signal is supplied; and a transmitting signal trigger output circuit which outputs a transmitting trigger signal based on said transmitting enable signal and said transmitting data; and a receiving signal trigger output circuit which outputs a receiving trigger signal based on said transmitting enable signal and said receiving data.

10. A data transmitting/receiving buffer according to claim 9, wherein said data line is a universal serial bus.

11. A data transmitting/receiving buffer according to claim 10, wherein said receiver is a differential-type receiver which receives a differential signal on said universal serial bus, and said driver is a differential-type driver which converts said transmitting data into said differential signal and outputs said converted differential signal to said data line.

12. A data transmitting/receiving buffer for transmitting/receiving data via a data line provided between a first apparatus and a second apparatus, comprising:

a receiver which receives a signal on said data line and which outputs receiving data;

a driver which outputs transmitting data to said data line when a transmitting enable signal is supplied; and a trigger output circuit which holds said transmitting enable signal at timing where said receiving data is changed and which outputs said transmitting enable signal as a trigger signal.

13. A data transmitting/receiving buffer according to claim 12, wherein said trigger output circuit comprises a flip flop having a clock terminal to receive said receiving data and a data terminal to receive said transmitting enable signal.

\* \* \* \* \*